(12) United States Patent
Wada (10) Patent No.: US 12,498,067 B2
(45) Date of Patent: Dec. 16, 2025

(54) PIPING MEMBER

(71) Applicant: NITTO KOHKI CO., LTD., Tokyo (JP)

(72) Inventor: Akihiro Wada, Tokyo (JP)

(73) Assignee: NITTO KOHKI CO., LTD., Tokyo (JP)

( * ) Notice: Subject to any disclaimer, the term of this patent is extended or adjusted under 35 U.S.C. 154(b) by 100 days.

(21) Appl. No.: 18/475,932

(22) Filed: Sep. 27, 2023

(65) Prior Publication Data

US 2024/0019062 A1    Jan. 18, 2024

Related U.S. Application Data

(63) Continuation of application No. PCT/JP2022/008720, filed on Mar. 2, 2022.

(30) Foreign Application Priority Data

Mar. 30, 2021  (JP) .................................. 2021-056709

(51) Int. Cl.
*F16L 37/22*  (2006.01)
*F16L 37/28*  (2006.01)

(52) U.S. Cl.
CPC .............. *F16L 37/22* (2013.01); *F16L 37/28* (2013.01)

(58) Field of Classification Search
CPC .................................. F16L 37/22; F16D 3/34
USPC .......................................................... 251/77
See application file for complete search history.

(56) References Cited

U.S. PATENT DOCUMENTS

| 1,491,186 A | * | 4/1924 | Bartlett | F16D 3/34 464/115 |
| 1,519,517 A | * | 12/1924 | Thayer | F01N 5/00 251/76 |
| 1,947,965 A | * | 2/1934 | Beggs | F16D 3/2052 464/115 |

(Continued)

FOREIGN PATENT DOCUMENTS

| GB | 1185195 | 3/1970 |
| JP | S4717835 | 6/1972 |

(Continued)

OTHER PUBLICATIONS

International Search Report issued in corresponding International Application PCT/JP2022/008720, mailed May 17, 2022.

*Primary Examiner* — Kenneth Rinehart
*Assistant Examiner* — Nicole Gardner
(74) *Attorney, Agent, or Firm* — Burris Law, PLLC (57) ABSTRACT

A handle mechanism of a piping member includes an inner member turnably attached to a pipe body and connected to a valve member in a fluid passage of the pipe body, an outer member turnably disposed outside the pipe body, and a coupling pin coupling together a first coupling end portion of the inner member and a second coupling end portion of the outer member in the direction of turning. The pipe body has a support surface located around the second coupling end portion. When a force acts on the outer member in a direction of pivoting the outer member about a pivot axis, the second coupling end portion engages the support surface, thereby allowing the outer member to be supported by the pipe body in the direction of pivoting.

8 Claims, 10 Drawing Sheets

(56) References Cited

U.S. PATENT DOCUMENTS

| | | | | |
|---|---|---|---|---|
| 2,067,612 | A * | 1/1937 | Loeffler | F01L 13/08 |
| | | | | 251/231 |
| 2,338,725 | A * | 1/1944 | Larson | F16K 31/60 |
| | | | | 74/504 |
| 2,781,782 | A * | 2/1957 | Gerwig | F15B 13/12 |
| | | | | 137/625.48 |
| 4,579,316 | A * | 4/1986 | Velan | F16K 5/184 |
| | | | | 251/360 |
| 5,671,777 | A | 9/1997 | Allen et al. | |
| 2008/0017815 | A1 * | 1/2008 | Callahan | F16K 1/50 |
| | | | | 251/77 |
| 2008/0017816 | A1 * | 1/2008 | Willats | F02D 9/08 |
| | | | | 251/77 |
| 2008/0128034 | A1 | 6/2008 | Fahl | |
| 2009/0293654 | A1 * | 12/2009 | Pintauro | F16K 1/221 |
| | | | | 74/63 |

FOREIGN PATENT DOCUMENTS

| | | |
|---|---|---|
| JP | S54158957 | 11/1979 |
| JP | S58122025 | 8/1983 |
| JP | 2021021469 | 2/2021 |
| WO | 2021020126 | 2/2021 |

* cited by examiner

PIPING MEMBER

CROSS-REFERENCE TO RELATED APPLICATION

This application is a continuation of International Application No. PCT/JP2022/008720, filed on Mar. 2, 2022, which claims priority to and the benefit of Japanese Patent Application No. 2021-056709, filed on Mar. 30, 2021. The disclosures of the above applications are incorporated herein by reference in their entireties.

FIELD

The present disclosure relates to a piping member including a handle mechanism for opening and closing a valve member disposed in a fluid passage of a pipe.

BACKGROUND

There exist piping members including a handle mechanism for opening and closing a valve member disposed in a fluid passage. For example, Japanese Patent Application Publication No 2021-21469 discloses a piping member having a valve member disposed in a fluid passage of a pipe body displaceably in the direction of the longitudinal axis of the fluid passage. The piping member is configured to open and close the valve member by turning a handle disposed outside the pipe body. More specifically, the handle is secured to a shaft portion extending along a rotation axis traversing the fluid passage, and the valve member is connected to the shaft portion through a link member. When the handle is turned about the rotation axis, the shaft portion is also turned together with the handle, causing the valve member connected to the end of the link member to be displaced in the direction of the longitudinal axis of the fluid passage. The displacement of the valve member in the longitudinal axis direction allows the fluid passage to be opened and closed.

In the piping member disclosed in Japanese Patent Application Publication No 2021-21469, the shaft portion of the handle mechanism includes an inner shaft portion extending to traverse the fluid passage and turnably attached to the pipe body, and an outer shaft portion secured to the end of the inner shaft portion outside the pipe body by a coupling pin. The end of the outer shaft portion has a recess configured to coaxially receive the end of the inner shaft portion. With the end of the inner shaft portion received in the recess, the coupling pin is fitted so as to extend through the respective ends of the outer and inner shaft portions.

The handle of the above-described handle mechanism is often made relatively large in size in order to facilitate the opening-closing operation of the valve member. In addition, the handle mechanism of the above-described type is often used in relatively large pipes, and hence the overall weight of the piping member also tends to be heavy. Consequently, when the piping member is accidentally dropped during transportation or installation to a pipe, the handle sticking out considerably from the pipe body may first crash with the ground, so that a great impact may be applied to the handle. If such a situation occurs, the impact may be transmitted to the shaft portion, which is secured to the handle, causing the shaft member to bend or break. Particularly when the shaft member includes an inner shaft portion and an outer shaft portion which are connected together by a coupling pin, as has been described above, the inner member, which is relatively thin and weak in mechanical strength, is very likely to break.

The teachings of the present disclosure address these and other issues with conventional piping members.

SUMMARY

The present disclosure has been made in view of the above-described problems of the conventional technique for piping members, and an object of the present disclosure is to provide a piping member configured so that the shaft portion of the handle mechanism is less likely to break even if a great impact is applied to the handle.

That is, the present disclosure provides a piping member including a pipe body having a fluid passage, a valve member disposed in the fluid passage, and a handle mechanism for opening and closing the valve member. The handle mechanism includes a shaft-shaped inner member attached to the pipe body so as to be turnable about a rotation axis traversing the fluid passage. The inner member is connected to the valve member in the fluid passage and has a first coupling end portion projecting outside the pipe body. The handle mechanism further includes an outer member disposed outside the pipe body so as to be turnable about the rotation axis. The outer member has a second coupling end portion and a handle. The second coupling end portion is formed with a recess to receive the first coupling end portion, the outer member having a handle. The handle mechanism further includes a coupling part coupling together the first coupling end portion and the second coupling end portion in the direction of turning of the inner member so that the outer member is pivotable relative to the inner member about a pivot axis perpendicular to the rotation axis. The pipe body has a support surface located around the second coupling end portion. When a force acts on the outer member in a direction of pivoting the outer member about the pivot axis, the second coupling end portion engages the support surface, thereby allowing the outer member to be supported by the pipe body in the direction of pivoting.

In the piping member, when a force acts in a direction of pivoting the outer member of the handle mechanism about the pivot axis, the second coupling end portion of the outer member engages the support surface of the pipe body, thereby allowing the outer member to be supported by the pipe body in the pivot direction. Therefore, the above-described force is received by the pipe body and thus can be substantially prevented from acting on the inner member. Consequently, it is possible to prevent the inner member from bending or breaking which would otherwise occur when a great force acts on the handle mechanism, particularly the inner member.

The coupling part may couple together the first coupling end portion and the second coupling end portion such that the outer member is displaceable relative to the inner member in the direction of the pivot axis. Thus, when the outer member is displaced relative to the inner member in the direction of the pivot axis, the second coupling end portion of the outer member may engage the support surface, thereby being supported.

With the above-described arrangement, when a force acts on the outer member in the direction of the pivot axis, it is also possible to prevent the force from acting on the inner member.

Specifically, the coupling part may be a coupling pin extending along the pivot axis through the first coupling end portion and the second coupling end portion.

Further, the first coupling end portion may have a first insertion hole receiving the coupling pin, and the second coupling end portion may have a second insertion hole receiving the coupling pin. One of the first insertion hole and the second insertion hole may have a first inner diameter greater than the outer diameter of the coupling pin in the direction of the rotation axis, so that the outer member may be displaceable relative to the inner member also about an axis perpendicular to the rotation axis and the longitudinal axis of the coupling pin.

With the above-described arrangement, no matter in which direction a force acts on the outer member so as to cause the outer member to pivot about the coupling part or the vicinity thereof, it is also possible to substantially prevent the applied force from acting on the inner member.

Further, the one of the first insertion hole and the second insertion hole may be a hole of elliptical cross-section having a second inner diameter substantially the same as the outer diameter of the coupling pin in a direction perpendicular to the rotation axis and the longitudinal axis.

Further, the first coupling end portion may have an outer peripheral surface of circular cross-section with a first diameter, and the second coupling end portion may have an inner peripheral surface of circular cross-section with a second diameter and an outer peripheral surface of circular cross-section with a third diameter. The support surface may be an inner peripheral surface of circular cross-section with a fourth diameter. The difference between the first diameter and the second diameter may be greater than the difference between the third diameter and the fourth diameter, so that when the outer member is displaced relative to the inner member, the outer peripheral surface of the first coupling end portion and the inner peripheral surface of the second coupling end portion are prevented from contacting each other.

Further, the outer member may have a first axial support portion, and the pipe body may have a second axial support portion. The first axial support portion and the second axial support portion may be configured to engage each other in the direction of the rotation axis, thereby allowing the outer member to be supported by the pipe body in the direction of the rotation axis.

Specifically, the pipe body may have a cylindrical retaining portion projecting from the outer peripheral surface of the pipe body in the direction of the rotation axis. The support surface may be formed on the inner peripheral surface of the cylindrical retaining portion, and the second axial support portion may be formed on an end face of the cylindrical retaining portion.

Forms of a piping member according to the present disclosure will be explained below on the basis of the accompanying drawings.

DETAILED DESCRIPTION

Figure 1:
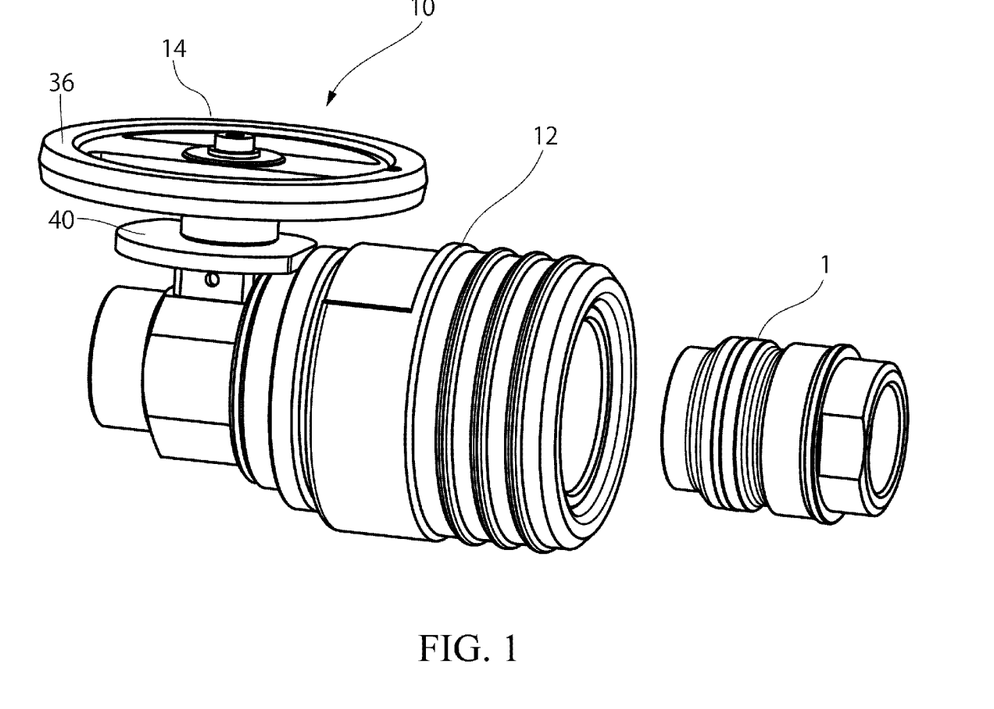
FIG. 1 is a perspective view showing a piping member according to the present disclosure, together with a joint member to be coupled to the piping member.

As shown in FIG. 1, a piping member 10 according to one form of the present disclosure includes a pipe body 12 and a handle mechanism 14 attached to the pipe body 12. The pipe body 12 is detachably couplable to an associated joint member 1.

Figure 2:
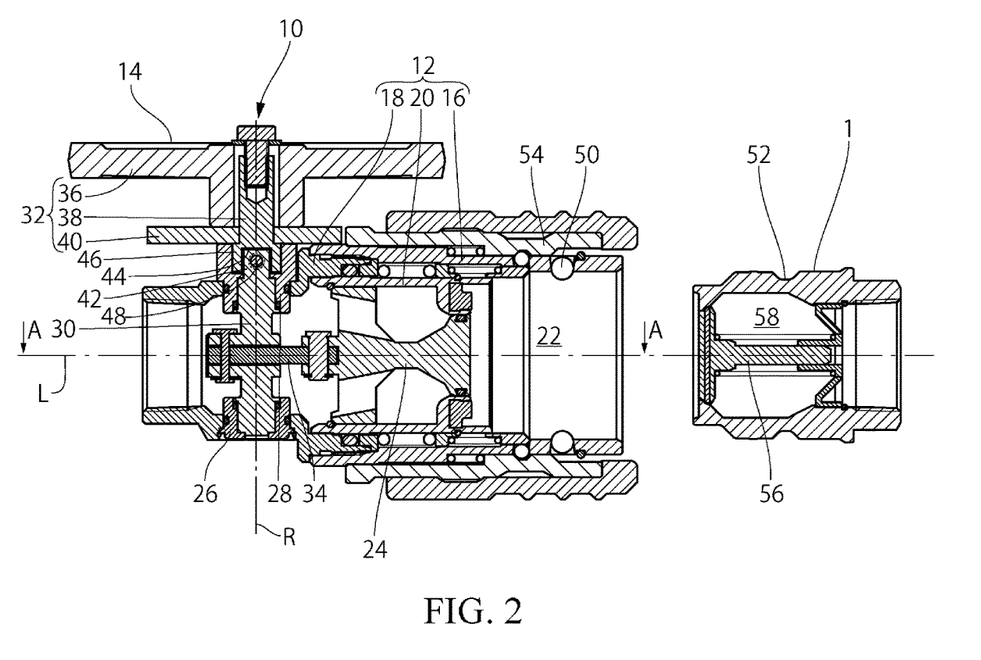
FIG. 2 is a sectional view of the piping member and the joint member of FIG. 1.
Figure 3:
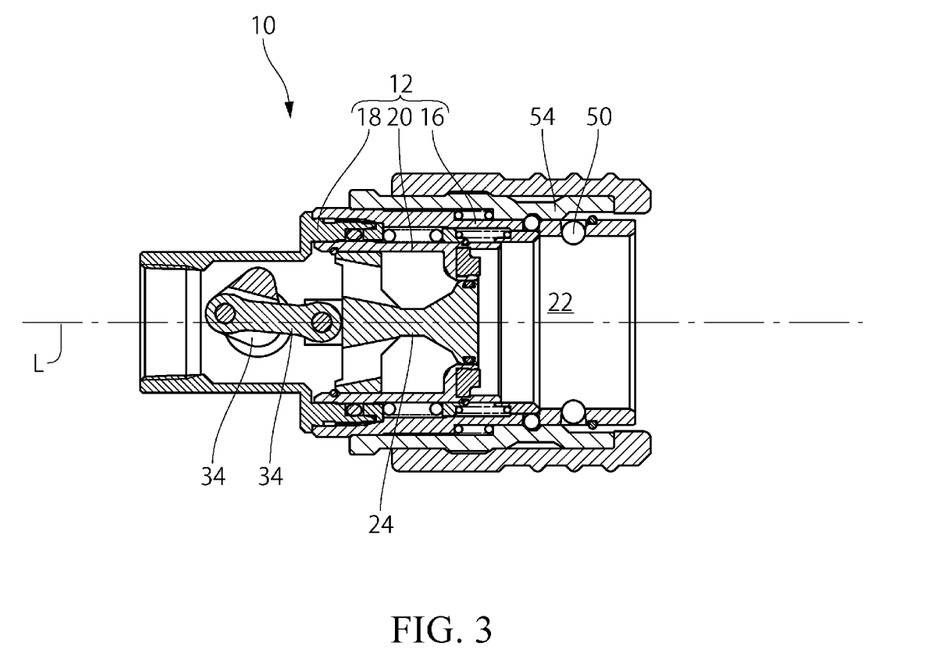
FIG. 3 is a sectional view of the piping member of FIG. 1, taken along the line A-A shown in FIG. 2.

As shown in FIGS. 2 and 3, the pipe body 12 has a forward body member 16, a rear body member 18, and an inner body member 20, which in combination define a fluid passage 22. The fluid passage 22 has a valve member 24 disposed therein. The valve member 24 is displaceable in the direction of a longitudinal axis L of the pipe body 12 to open and close the fluid passage 22. The pipe body 12 further has a lower bearing member 26 and an upper bearing member 28 ("lower" and "upper" as viewed in the figure).

The handle mechanism 14 has an inner member 30 attached to the pipe body 12 so as to traverse the fluid passage 22, and an outer member 32 disposed outside the pipe body 12. The inner member 30 is a shaft-shaped member extending along a rotation axis R traversing the fluid passage 22 and is held by the lower and upper bearing members 26 and 28 of the pipe body 12 so as to be turnable about the rotation axis R. In addition, the inner member 30 is connected to the valve member 24 through a link member 34. The outer member 32 has a ring-shaped handle 36, an outer shaft portion 38 extending from the handle 36 toward the inner member 30 in the direction of the rotation axis R, and a disk-shaped member 40 secured by being held between the handle 36 and the outer shaft portion 38. The inner member 30 has a circular columnar first coupling end portion 42 projecting outside the pipe body 12, and the outer member 32 has a cylindrical second coupling end portion 46 having a recess 44 formed therein to coaxially receive the first coupling end portion 42. The first coupling end portion 42 and the second coupling end portion 46 are coupled together in the direction of turning by a circular columnar coupling pin (coupling part) 48.

Figure 4:
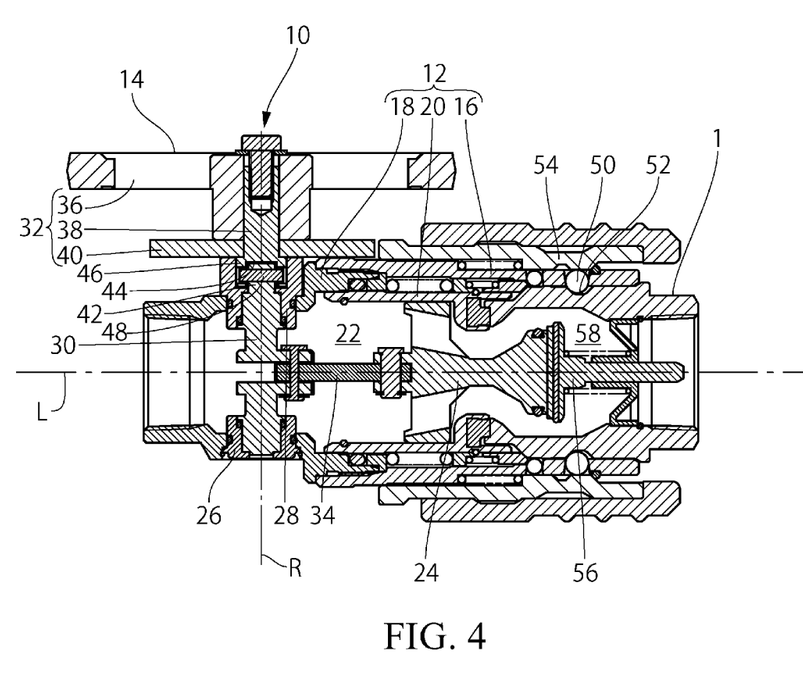
FIG. 4 is a sectional view of the piping member having the joint member coupled thereto, with a valve member placed in an open position according to the present disclosure.

When the associated joint member 1 is inserted into the fluid passage 22 of the pipe body 12 of the piping member 10, as shown in FIG. 4, the joint member 1 is coupled to the piping member 10. In this coupled state, a locking element 50 of the piping member 10 engages an annular locking groove 52 of the joint member 1 and is held by a sleeve 54 in the position where the locking element 50 engages the annular locking groove 52. Thus, the joint member 1 is coupled to the piping member 10 and held in the coupled position. If the handle 36 is turned in the coupled state, the inner member 30, which is coupled by the coupling pin 48, is also turned together with the handle 36. As the inner member 30 is turned, the valve member 24, which is connected to the inner member 30 through the link member 34, is displaced forward (rightward as viewed in the figure) along the longitudinal axis L. At this time, a valve member 56 of the joint member 1 is also pushed and displaced. Consequently, as shown in the figure, the fluid passage 22 of the piping member 10 and a fluid passage 58 of the joint member 1 are opened and communicated with each other.

Figure 5A:
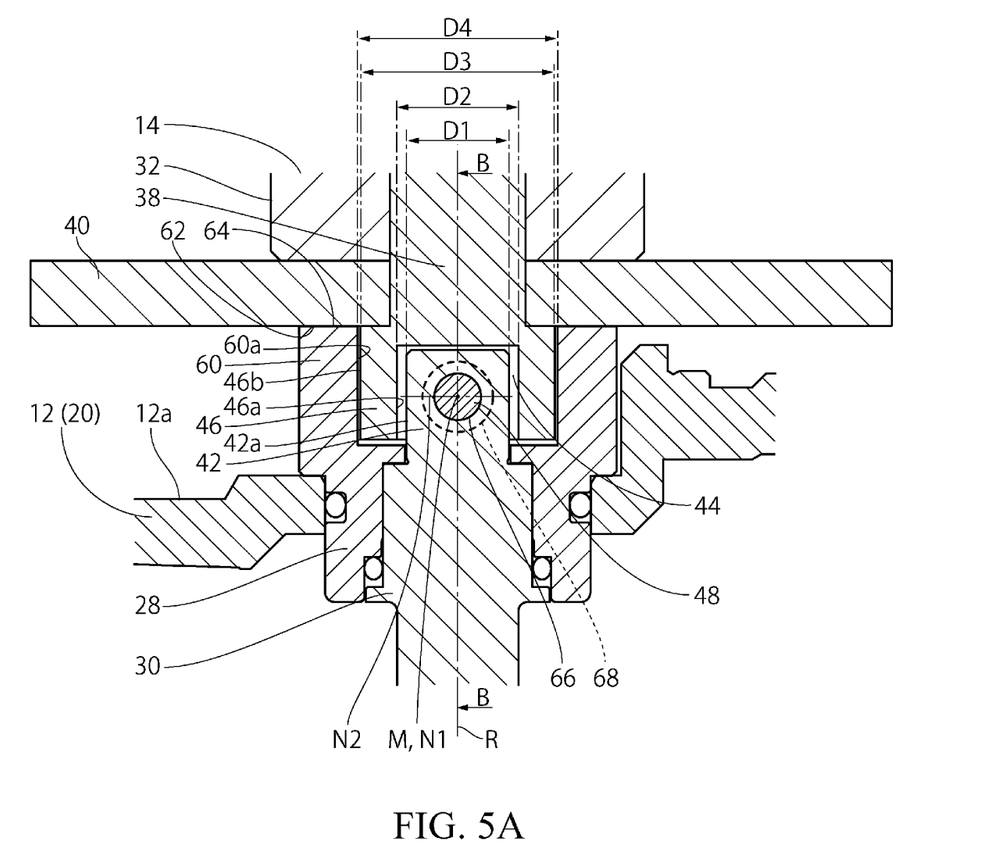
FIG. 5A is an enlarged sectional view of a portion of FIG. 2, illustrating a handle mechanism where an inner member and an outer member of the handle mechanism are coupled together according to the present disclosure.
Figure 6A:
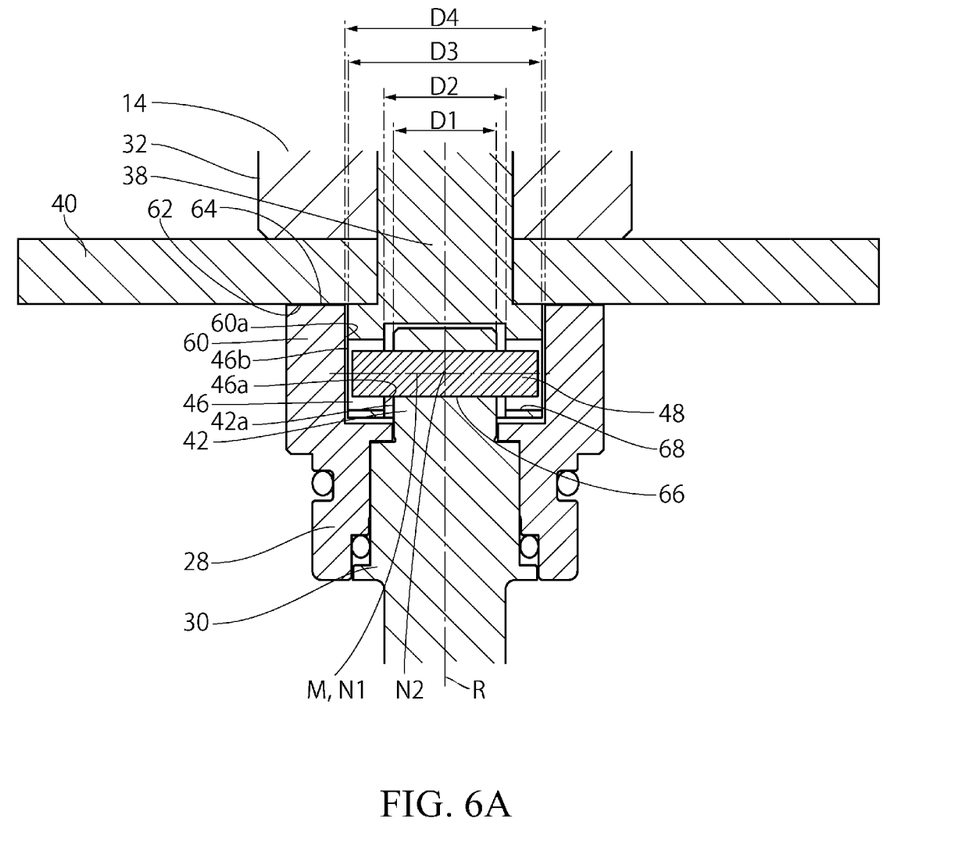
FIG. 6A is an enlarged sectional view of a portion of the piping member of FIG. 1, taken along the line B-B in FIG. 5A.

As shown in FIGS. 5A and 6A, the upper bearing member 28 of the pipe body 12 constitutes a cylindrical retaining portion 60 projecting outside from an outer peripheral surface 12a of the pipe body 12 in the direction of the rotation axis R. The second coupling end portion 46 is located inside the cylindrical retaining portion 60. Further, a first axial support portion 62 defined by the lower surface of the disk-shaped member 40 engages a second axial support portion 64 defined by an end face of the cylindrical retaining portion 60 in the direction of the rotation axis R, thereby allowing the outer member 32 to be supported by the piping member 10 in the direction of the rotation axis R. The first coupling end portion 42 of the inner member 30 has a first insertion hole 66 receiving the coupling pin 48, and the second coupling end portion 46 of the outer member 32 has a second insertion hole 68 receiving the coupling pin 48. The first insertion hole 66 is sized to fit the coupling pin 48 therein so that the coupling pin 48 is press-fitted and secured to the first insertion hole 66. On the other hand, the second insertion hole 68 has an inner diameter greater than the outer diameter of the coupling pin 48. When the outer member 32 is turned, the second insertion hole 68 engages the coupling pin 48, and through the coupling pin 48, the outer member 32 is coupled to the inner member 30 in the direction of turning.

The first coupling end portion 42 has an outer peripheral surface 42a of circular cross-section with a first diameter D1. The second coupling end portion 46 has an inner peripheral surface 46a of circular cross-section with a second diameter D2 and an outer peripheral surface 46b of circular cross-section with a third diameter D3. The cylindrical retaining portion 60 has an inner peripheral surface 60a of circular cross-section with a fourth diameter D4. The first coupling end portion 42 and the second coupling end portion 46 are designed in shape and size so that the difference Δ1 between the first diameter D1 and the second diameter D2 is greater than the difference Δ2 between the third diameter D3 and the fourth diameter D4. In other words, the gap between the first coupling end portion 42 and the second coupling end portion 46 is greater than the gap between the second coupling end portion 46 and the cylindrical retaining portion 60. Consequently, the outer peripheral surface 42a of the first coupling end portion 42 and the inner peripheral surface 46a of the second coupling end portion 46 are prevented from contacting each other, as will be described later.

The outer member 32 is coupled to the inner member 30 in the direction of turning by the coupling pin 48, as has been described above, and the outer member 32 is pivotable relative to the inner member 30 about a pivot axis N1 substantially coincident with a longitudinal axis M of the coupling pin 48, which is perpendicular to the rotation axis R. In addition, the second insertion hole 68 of the second coupling end portion 46 is greater than the coupling pin 48; therefore, the outer member 32 is also pivotable relative to the inner member 30 and the coupling pin 48 about a pivot axis N2 perpendicular to the rotation axis R and the longitudinal axis M. Further, the outer member 32 is also displaceable relative to the inner member 30 in the direction of the longitudinal axis M.

Figure 5B:
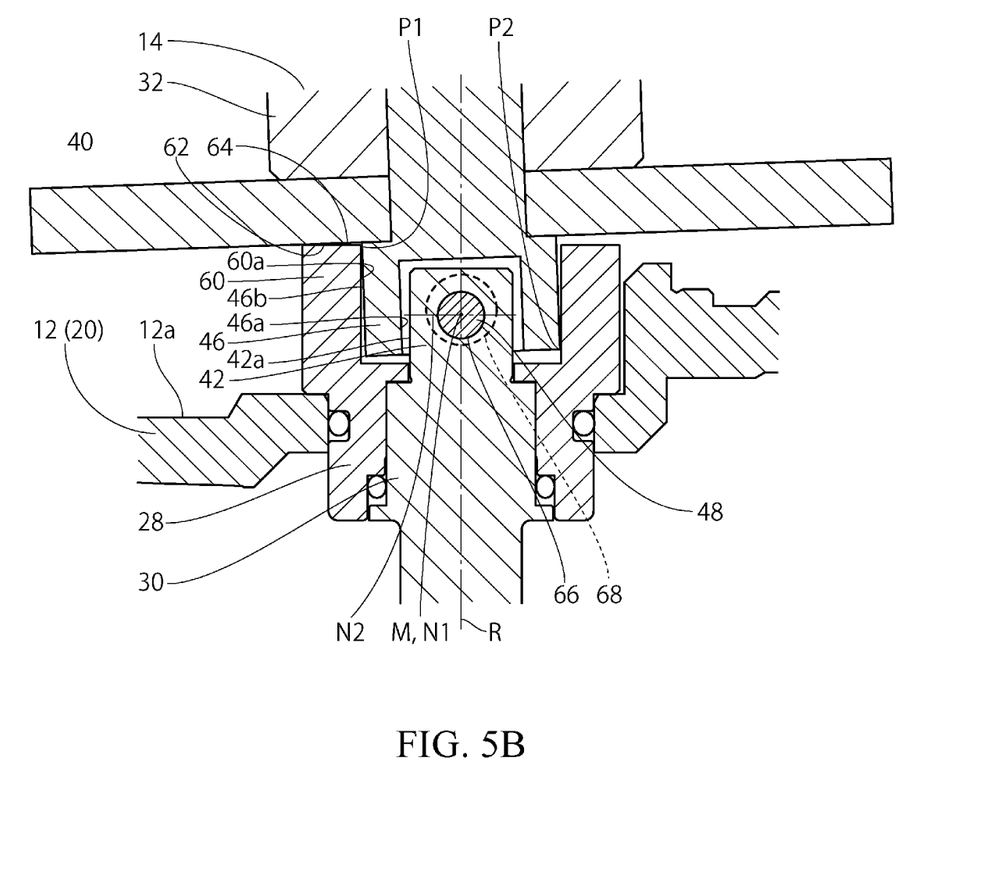
FIG. 5B is an enlarged sectional view similar to FIG. 5A, showing a state where the outer member of the handle mechanism has pivoted about a pivot axis N1 relative to the inner member of the handle mechanism according to the present disclosure.

If the outer member 32 is pivoted about the longitudinal axis M (pivot axis N1) of the coupling pin 48 upon application of a force to the handle 36 of the outer member 32, for example, as shown in FIG. 5B, the outer peripheral surface 46b of the second coupling end portion 46 engages the inner peripheral surface (support surface) 60a of the cylindrical retaining portion 60, which is located around the outer peripheral surface 46b, resulting in the outer member 32 being supported by the pipe body 12 in the direction of pivoting. More specifically, the outer member 32 is blocked from further pivoting by engagement of the second coupling end portion 46 with the inner peripheral surface 60a at positions P1 and P2 facing each other across an imaginary plane passing through the rotation axis R and the pivot axis N1. At this time, the outer member 32 engages the second axial support portion 64 also at a leftward position of the first axial support portion 62 as viewed in FIG. 5B. Accordingly, the outer member is displaced slightly upward as viewed in the figure while pivoting about the coupling pin 48.

Figure 6B:
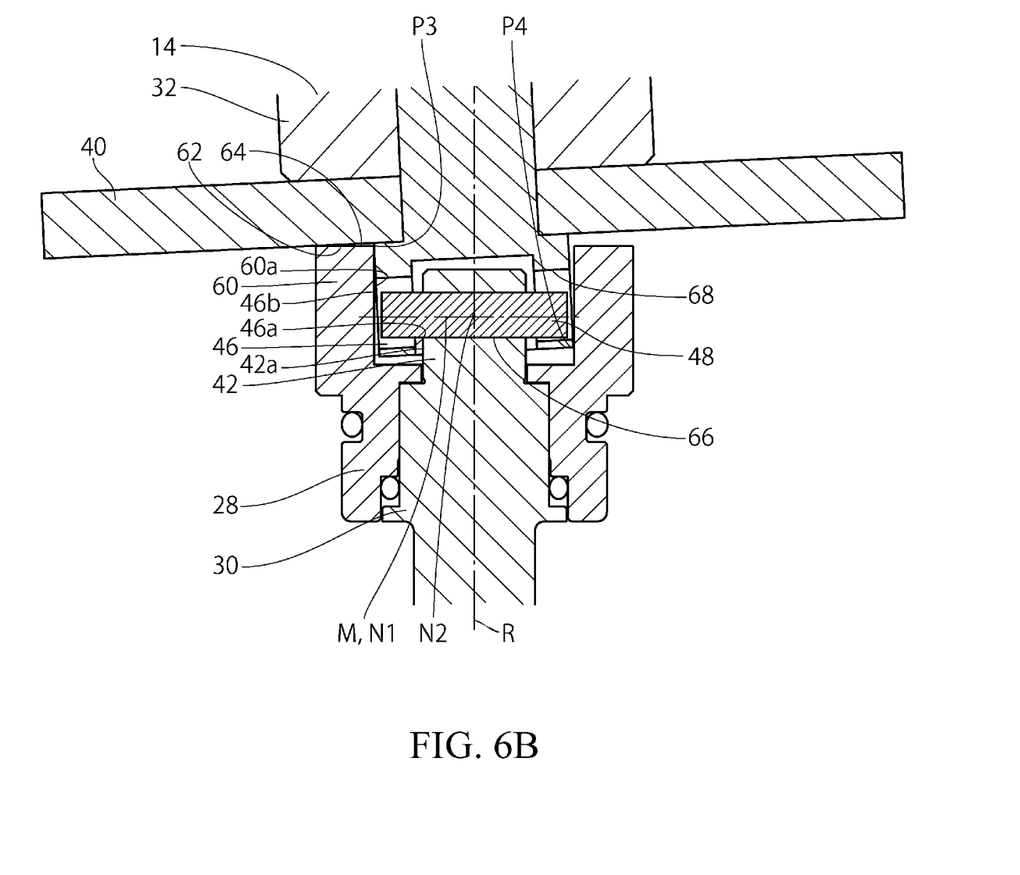
FIG. 6B is an enlarged sectional view similar to FIG. 6A, showing a state where the outer member of the handle mechanism has pivoted about a pivot axis N2 relative to the inner member of the handle mechanism according to the present disclosure.

If the outer member 32 is pivoted about the pivot axis N2, which is perpendicular to the rotation axis R and the longitudinal axis M, upon application of a force to the handle 36 of the outer member 32, for example, as shown in FIG. 6B, the outer peripheral surface 46b of the second coupling end portion 46 engages the inner peripheral surface 60a of the cylindrical retaining portion 60, resulting in the outer member 32 being supported by the pipe body 12 in the direction of pivoting. In the same way as the outer member 32 is pivoted about the longitudinal axis M (pivot axis N1) of the coupling pin 48, the second coupling end portion 46 engages the inner peripheral surface (support surface) 60a at positions P3 and P4 facing each other across an imaginary plane passing through the rotation axis R and the pivot axis N2, thereby blocking the outer member 32 from further pivoting.

Figure 6C:
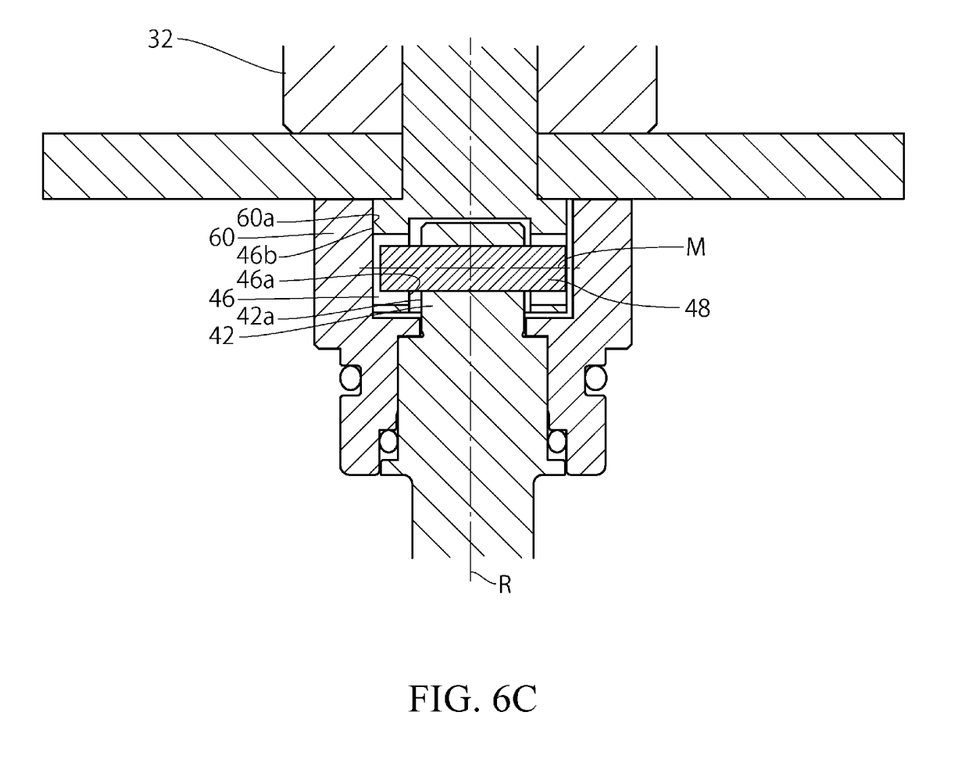
FIG. 6C is an enlarged sectional view similar to FIG. 6A, showing a state where the outer member of the handle mechanism has been displaced relative to the inner member of the handle mechanism in the direction of a longitudinal axis M of a coupling pin according to the present disclosure.

If the outer member 32 is displaced in parallel to the direction of the longitudinal axis M of the coupling pin 48 upon application of a force to the handle 36 of the outer member 32, for example, as shown in FIG. 6C, the outer peripheral surface 46b of the second coupling end portion 46 engages the inner peripheral surface 60a of the cylindrical retaining portion 60 on one side thereof, resulting in the outer member 32 being supported by the pipe body 12 in the direction of the longitudinal axis M. It should be noted that no matter in which direction the outer member 32 is pivoted or displaced, the outer peripheral surface 42a of the first coupling end portion 42 and the inner peripheral surface 46a of the second coupling end portion 46 will not come into direct contact with each other.

Thus, in the piping member 10, when a force acts on the handle 36 of the handle mechanism 14 in a direction intersecting the rotation axis R, the outer member 32 including the handle 36 is supported by the cylindrical retaining portion 60 of the pipe body 12. Therefore, the force applied to the handle 36 in the direction intersecting the rotation axis R is received by the pipe body 12 and does not substantially act on the inner member 30. Accordingly, even if great impact is applied to the handle 36 due to dropping the piping member 10, for example, no great force acts on the inner member 30, which is relatively small in diameter and hence low in mechanical strength, thus making it possible to prevent the inner member 30 from bending or breaking.

Figure 7:
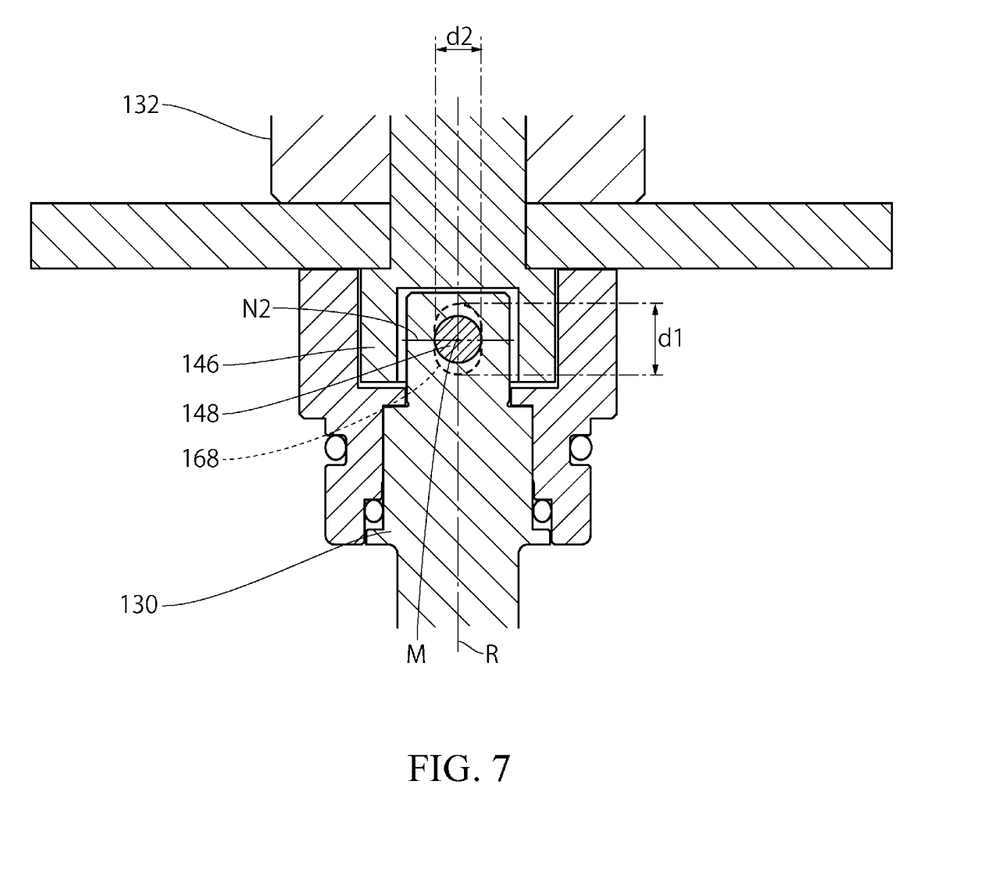
FIG. 7 is an enlarged sectional view of a piping member according to another form of the present disclosure, which shows a part of a handle mechanism of the piping member where an inner member and an outer member of the handle mechanism are coupled together.

FIG. 7 shows a piping member according to another form in which a second insertion hole 168 formed in the second coupling end portion 146 of the outer member 132 is a hole having an elliptical cross-section longer in the direction of the rotation axis R. The second insertion hole 168 has a first inner diameter d1 in the direction of the rotation axis R. The first inner diameter d1 is greater than the outer diameter of the coupling pin 148. The second insertion hole 168 further has a second inner diameter d2 in a direction perpendicular to the rotation axis R and the longitudinal axis M. The second inner diameter d2 is substantially the same as the outer diameter of the coupling pin 148. The fact that the first inner diameter d1 is greater than the coupling pin 148 allows the outer member 32 to pivot about the pivot axis N2 perpendicular to the rotation axis R and the longitudinal axis M. On the other hand, the fact that the second inner diameter d2 is substantially the same as the coupling pin 148 eliminates or extremely reduces the backlash between the outer member 132 and the inner member 130 in the direction of turning. Consequently, the operation of the handle is allowed to be even more directly transmitted to the inner member 130 and the valve member located therebeyond, and thus the handle operability is improved.

Although some example forms of the present disclosure have been described above, the present disclosure is not limited to these forms. For example, the coupling pin, which constitutes the coupling part for coupling together the first coupling end portion of the inner member and the second coupling end portion of the outer member in the direction of turning, may be replaced by other structures, e.g., a projection extending outward from the first coupling end portion, or a projection extending inward from the second coupling end portion. Further, the coupling pin may be secured to the second coupling end portion so that the coupling pin can be pivoted or displaced together with the outer member relative to the inner member. Further, although in the foregoing forms a gap is formed between the outer peripheral surface of the second coupling end portion and the inner peripheral surface (support surface) of the cylindrical retaining portion, such a gap need not always be formed. If it is configured that no such gap is provided, the outer member cannot substantially be pivoted or displaced relative to the inner member and the pipe body. However, as has been described above, the outer member and the inner member are coupled so as to be pivotable and displaceable relative to each other. Therefore, when a force acts on the outer member in such a direction as to cause pivoting or displacement, the outer member is supported by the support surface of the pipe body, and the applied force is received by the pipe body and can be substantially prevented from acting on the inner member.

What is claimed is:

1. A piping member comprising:
    a pipe body having a fluid passage;
    a valve member disposed in the fluid passage; and
    a handle mechanism for opening and closing the valve member;
    wherein the handle mechanism comprises:
        a shaft-shaped inner member attached to the pipe body so as to be turnable about a rotation axis traversing the fluid passage, the inner member connected to the valve member in the fluid passage and having a first coupling end portion projecting outside the pipe body;
        an outer member disposed outside the pipe body so as to be turnable about the rotation axis, the outer member having a second coupling end portion and a handle, the second coupling end portion formed with a recess to receive the first coupling end portion; and
        a coupling part coupling together the first coupling end portion and the second coupling end portion in a direction of turning of the inner member so that the outer member is pivotable relative to the inner member about a pivot axis perpendicular to the rotation axis and extending through the coupling part;
    wherein the pipe body has a support surface that surrounds the second coupling end portion and the coupling part; and
    wherein when a force acts on the outer member in a direction of pivoting the outer member about the pivot axis, the second coupling end portion engages the support surface, thereby allowing the outer member to be supported by the pipe body in the direction of pivoting such that the force is substantially prevented from acting on the inner member.

2. The piping member of claim 1, wherein the coupling part couples together the first coupling end portion and the second coupling end portion such that the outer member is displaceable relative to the inner member in a direction of the pivot axis, so that when the outer member is displaced relative to the inner member in the direction of the pivot axis, the second coupling end portion of the outer member engages the support surface, thereby being supported.

3. The piping member of claim 1, wherein the coupling part is a coupling pin extending along the pivot axis through the first coupling end portion and the second coupling end portion.

4. The piping member of claim 3, wherein the first coupling end portion has a first insertion hole receiving the coupling pin, and the second coupling end portion has a second insertion hole receiving the coupling pin, one of the first insertion hole and the second insertion hole having a first inner diameter greater than an outer diameter of the coupling pin in a direction of the rotation axis, so that the outer member is displaceable relative to the inner member also about an axis perpendicular to the rotation axis and a longitudinal axis of the coupling pin.

5. The piping member of claim 4, wherein the one of the first insertion hole and the second insertion hole is a hole of elliptical cross-section having a second inner diameter substantially the same as the outer diameter of the coupling pin in a direction perpendicular to the rotation axis and the longitudinal axis.

6. The piping member of claim 1, wherein the first coupling end portion has an outer peripheral surface of circular cross-section with a first diameter, the second coupling end portion has an inner peripheral surface of circular cross-section with a second diameter and an outer peripheral surface of circular cross-section with a third diameter, and the support surface is an inner peripheral surface of circular cross-section with a fourth diameter, and wherein a difference between the first diameter and the second diameter is greater than a difference between the third diameter and the fourth diameter, so that when the outer member is displaced relative to the inner member, the outer peripheral surface of the first coupling end portion and the inner peripheral surface of the second coupling end portion are prevented from contacting each other.

7. The piping member of claim 1, wherein the outer member has a first axial support portion, and the pipe body has a second axial support portion, the first axial support portion and the second axial support portion being configured to engage each other in the direction of the rotation axis, thereby allowing the outer member to be supported by the pipe body in the direction of the rotation axis.

8. The piping member of claim 7, wherein the pipe body has a cylindrical retaining portion projecting from an outer peripheral surface of the pipe body in the direction of the rotation axis, the support surface being formed on an inner peripheral surface of the cylindrical retaining portion, and the second axial support portion being formed on an end face of the cylindrical retaining portion.

\* \* \* \* \*